United States Patent
Ting et al.

[11] Patent Number: 6,020,019
[45] Date of Patent: Feb. 1, 2000

[54] HYDROGENATION OF HOP SOFT RESINS USING $CO_2$

[75] Inventors: Patrick L. Ting, Brookfield; Jay R. Refling, Milwaukee; Henry Goldstein, Brookfield, all of Wis.

[73] Assignee: Miller Brewing Company, Milwaukee, Wis.

[21] Appl. No.: 08/622,199

[22] Filed: Mar. 26, 1996

[51] Int. Cl.[7] .................................................. C12C 3/00
[52] U.S. Cl. ........................... 426/600; 568/347; 568/350
[58] Field of Search ............................ 426/600; 568/347, 568/350

[56] References Cited

U.S. PATENT DOCUMENTS

| | | | |
|---|---|---|---|
| 3,892,808 | 7/1975 | Mitchell | 426/349 |
| 3,933,919 | 1/1976 | Wilkinson | 252/431 |
| 4,212,895 | 7/1980 | Laws et al. | 426/600 |
| 4,218,491 | 8/1980 | Laws et al. | 426/600 |
| 4,584,140 | 4/1986 | Blewett et al. | 502/27 |
| 4,644,084 | 2/1987 | Cowles et al. | 426/600 |
| 5,013,571 | 5/1991 | Hay | 426/600 |
| 5,082,975 | 1/1992 | Todd, Jr. et al. | 568/315 |
| 5,166,449 | 11/1992 | Todd, Jr. et al. | 568/377 |
| 5,198,589 | 3/1993 | Rathke et al. | 568/451 |
| 5,200,227 | 4/1993 | Guzinski et al. | 426/600 |
| 5,296,637 | 3/1994 | Stegink et al. | 426/600 |
| 5,600,012 | 2/1997 | Poyner et al. | 568/347 |

OTHER PUBLICATIONS

Verzele et al, Chemistry and Analysis of Hop and Beer Bitter Acids, Elsevier, New York, 1991, pp. 127–129.
J. Carson, "The Hydrogenation of Lupulone and Humulone", 73 *J. Am. Chem. Soc.* 1850–1851 (1951).
M. Anteunis, et al., "On the Hydrogenation of Humulone", 68 *Bull. Soc. Chim. Belg.* 476–483 (1959).
M. Burk, et al., "Asymmetric Catalytic Hydrogenation Reaction in Supercritical Carbon Dioxide", 117 *J. Am. Chem. Soc.* 8277–8278 (1995).
P. Jessop, et al., "Homogenous Catalysis of Supercritical Fluids: Hydrogenation of Supercritical Carbon Dioxide to Formic Acid, Alkyl Formates, and Formamides", 118 *J. Am. Chem. Soc.* 344–355 (1996).

*Primary Examiner*—Curtis E. Sherrer
*Attorney, Agent, or Firm*—Quarles & Brady LLP

[57] ABSTRACT

Carbon dioxide is used as a reaction solvent in the hydrogenation of organic compounds. The carbon dioxide is preferably a liquid or a supercritical fluid. The hydrogenation method can be used advantageously in methods for making tetrahydroiso-alpha-acids from alpha-acids, iso-alpha-acids, or beta-acids. If beta-acids are used to make tetrahydroiso-alpha-acids, an acidic lower alcohol is preferably added to the carbon dioxide reaction medium to act as a promoter.

12 Claims, 4 Drawing Sheets

:
HYDROGENATION OF HOP SOFT RESINS USING CO₂

FIELD OF THE INVENTION

The present invention relates to the use of carbon dioxide as a hydrogenation reaction solvent. More particularly, it relates to the hydrogenation of hop soft resins and their derivatives using $CO_2$ to make tetrahydroiso-alpha-acids (tetrahydroisohumulones) which are known beer bittering agents.

DESCRIPTION OF THE PRIOR ART

Tetrahydroiso-alpha-acids (tetrahydroisohumulones) are light-stable FDA-approved bittering agents which can be used to add a hop flavor to beer. They usually are prepared from the beta-acids (or lupulones) in hop extracts. The hop extracts also contain alpha-acids (or humulones) but they are not normally used to make tetrahydroiso-alpha-acids for economical reasons. Alpha-acids and beta-acids are often referred to as "soft resins". The alpha-acids consist of three major analogs: cohumulone, humulone and adhumulone. Beta-acids consist of three major analogs: colupulone, lupulone and adlupulone.

Tetrahydroiso-alpha-acids have excellent light stability and the most bitter taste of the hop-derived bittering agents. They provide a beer with a foam which compares favorably with that in a beer which is conventionally hopped. The tetrahydroiso-alpha-acids can be prepared from either alpha-acids or from beta-acids which results in three analogs and two diastereoisomers. They are cis and trans-isomers of tetrahydroiso-cohumulone (THICO), tetrahydroiso-humulone (THISO) and tetrahydroiso-adhumulone (THIAD).

Worden, et al., U.S. Pat. No. 3,552,975, teach a method employing organic solvents and lead salts to make tetrahydroiso-alpha-acids from beta-acids. The final product is a crude mixture from which the lead residues can only be removed with great difficulty. The presence of residual lead in products to be consumed is obviously undesirable.

Worden, U.S. Pat. No. 3,923,897, discloses a process for preparing tetrahydroiso-alpha-acids from beta-acids by oxidizing desoxytetrahydro-alpha-acids (resulting from the hydrogenation of beta-acids) with a peracid followed by the isomerization of the resulting tetrahydro-alpha-acids. The process does not utilize lead salts but it is conducted in water immiscible organic solvents and it involves cumbersome solvent changes which increase process cost. The presence of even residual amounts of such solvents in food products, such as beverages, is undesirable.

Cowles, et al., U.S. Pat. No. 4,644,084, disclose a process for making tetrahydroiso-alpha-acids by treating beta-acids to form desoxytetrahydro-alpha-acids which are dissolved in an aqueous alcoholic caustic solution and then oxidized with an oxygen-containing gas to form the desired tetrahydrois-alpha-acids. The Cowles, et al. process does not use undesirable organic solvents and is superior to other known processes using beta-acids.

Hay, U.S. Pat. No. 5,013,571, teaches a process for simultaneously isomerizing and reducing alpha acids to tetrahydroiso-alpha-acids (THIAA). The Hay process uses relatively high pHs (8 to 10), significant amounts of water, high temperature, and hydrogen pressures above about 50 psig. As a result, side reactions can take place that can result in undesired products. Furthermore, the desired tetrahydroiso-alpha-acids are not easily isolated from the Hay reaction mixture.

Hydrogenation and hydrogenolysis are well-known processes which are commonly employed in many organic chemical synthesis schemes, including the manipulation of lupulones and humulones, and their derivatives. Usually, low molecular weight organic compounds are used as solvents ($C_1$–$C_6$). For example, Carson, 73 *J. Am. Chem. Soc.* 1850–1851 (1951), discusses the hydrogenation of lupulone and humulone using methanol as a solvent. Anteunis, et al., *Bull. Soc. Chim. Belg.* 476–483 (1959), disclose carrying out the hydrogenation of humulone in methanol or ethanol.

Wilkinson, U.S. Pat. No. 3,933,919, discloses hydrogenation, hydroformylation and carbonylation reactions using methanol, ethanol, and benzene as solvents. The Cowles patent, supra, discloses a process for hydrogenating beta acids to form desoxytetrahydro-alpha-acids where ethanol is used as a solvent. Todd, Jr., et al., U.S. Pat. Nos. 5,082,975 and 5,166,449, disclose the hydrogenation in water/methanol of beta acids to form hexahydro-beta-acids. Stegink, et al., U.S. Pat. No. 5,296,637, teach hydrogenation of alpha acids to form tetrahydro-alpha-acids using an aqueous or aqueous/lower alkanol solvent medium.

Alcohols and other organic compounds have been used for many years as solvents in hydrogenation processes. Thus, processes for the preparation of light stable bittering agents (tetrahydroiso-alpha-acids) can involve a key hydrogenation and/or hydrogenolysis step in ethanol under a hydrogen atmosphere using a palladium/carbon catalyst. Although ethanol may be recovered in practice, the loss of ethanol during the process (due to handling, reaction, and evaporation) is usually unavoidable and significant. One can readily appreciate that a process which avoids problems (such as solvent losses, environmental problems, and residual solvent contamination of the final product) associated with organic solvents would be of significant importance.

We have discovered a surprising breakthrough using liquid and/or supercritical carbon dioxide as a solvent for the hydrogenolysis and/or hydrogenation of organic compounds, including alpha and beta-acids. Three major advantages of carbon dioxide include: 1) it is less expensive than ethanol (about $0.28/gallon vs. $30/gallon); 2) it presents no fire hazard; and 3) it presents little or no health/environmental problems. Carbon dioxide is the solvent of choice in a wide range of extraction processes. For example $CO_2$ is used for decaffeination in the coffee industry and for hop extraction in the brewing industry. However, the use of liquid $CO_2$ in organic reactions has not received much attention, despite $CO_2$ being much less harmful for the health and environment than organic solvents.

SUMMARY OF THE INVENTION

A first aspect of the present invention provides a method of hydrogenating an organic compound capable of being hydrogenated comprising combining the organic compound, hydrogen, and a hydrogenation catalyst with a carbon dioxide reaction medium to form a mixture; and reacting the mixture under suitable conditions to thereby hydrogenate the organic compound. Preferably, the carbon dioxide is a liquid or a supercritical fluid.

The above method is preferably used where the organic compound is selected from the group consisting of alpha-acids, iso-alpha-acids, and beta-acids. If the organic compounds are beta-acids then the reaction medium preferably further comprises an acidified lower alkyl alcohol (as a modifier or promoting additive). Most preferably, the acidified lower alkyl alcohol is ethanol and sulfuric acid. The mixture is reacted at a temperature of about 0° to 65° C. and a pressure of about 200 to 4000 psig.

A second aspect of the present invention provides a method of making tetrahydroiso-alpha-acids comprising combining iso-alpha-acids, hydrogen, and a hydrogenation catalyst with a carbon dioxide reaction medium to form a mixture; reacting the mixture under suitable conditions to thereby hydrogenate the iso-alpha-acids to tetrahydroiso-alpha-acids; and recovering the tetrahydroiso-alpha-acids from the reaction mixture. Preferably, the carbon dioxide is a liquid or a supercritical fluid. The mixture is reacted at a temperature of about 0° to 65° C. and a pressure of about 200 to 4000 psig.

A third aspect of the present invention discloses a method of making tetrahydroiso-alpha-acids comprising combining beta-acids, hydrogen, and a hydrogenation catalyst with a carbon dioxide reaction medium to form a mixture; reacting the mixture under suitable conditions to thereby hydrogenate the beta-acids to desoxytetrahydro-alpha-acids; oxidizing the desoxytetrahydro-alpha-acids to tetrahydro-alpha-acids; isomerizing the tetrahydro-alpha-acids to tetrahydroiso-alpha-acids; and recovering the tetrahydroiso-alpha-acids. Preferably, the carbon dioxide is a liquid or a supercritical fluid. The mixture is reacted at a temperature of about 0° to 65° C. and a pressure of about 200 to 4000 psig. Preferably, an acidic lower alkyl alcohol is added to the carbon dioxide reaction medium to thereby encourage the formation of desoxytetrahydro-alpha-acids.

A fourth aspect of the present invention provides a method of making tetrahydroiso-alpha-acids comprising combining alpha-acids, hydrogen, and a hydrogenation catalyst with a carbon dioxide reaction medium to form a mixture; reacting the mixture under suitable conditions to thereby hydrogenate the alpha-acids to tetrahydro-alpha-acids; isomerizing the tetrahydro-alpha-acids to tetrahydroiso-alpha-acids; and recovering the tetrahydroiso-alpha-acids. Preferably, the carbon dioxide is a liquid or a supercritical fluid. The mixture is reacted at a temperature of about 0° to 65° C. and a pressure of about 200 to 4000 psig.

Another aspect of the invention provides tetrahydroiso-alpha-acids made according to the method of the second aspect of the invention, tetrahydroiso-alpha-acids made according to the method of the third aspect of the invention, and tetrahydroiso-alpha-acids made according to the method of the fourth aspect of the invention.

It will be appreciated that it has been discovered that liquid or supercritical carbon dioxide can be used as a solvent for hydrogenating organic compounds. In particular, liquid or supercritical carbon dioxide can be advantageously used as a hydrogenation solvent for making tetrahydroiso-alpha-acids from alpha-acids, iso-alpha-acids, and beta-acids.

The objects of the present invention therefore include providing carbon dioxide as a hydrogenation reaction solvent that:

(a) is less costly than organic solvents;
(b) avoids the environmental/health problems of organic solvents;
(c) presents no fire hazards;
(d) facilitates isolation/recovery of the reaction product; and
(e) avoids unwanted side reactions.

These and still other objects and advantages of the present invention will be apparent from the description below.

DETAILED DESCRIPTION OF THE INVENTION

Experiments were carried out using a laboratory autoclave as the reactor. Due to this equipment constraint, the reactions could not be optimized.

By hydrogenation we mean any reaction of hydrogen with an organic compound. It may occur either as direct addition of hydrogen to the double bonds of unsaturated molecules, resulting in a saturated product, or it may cause rupture of the bonds of organic compounds, with subsequent reaction of hydrogen with the molecular fragments. Examples of the first type (called addition hydrogenation) are the conversion of aromatics to cycloparaffins and the hydrogenation of unsaturated vegetable oils to solid fats by addition of hydrogen to their double bonds. Examples of the second type (called hydrogenolysis) are hydrocracking of petroleum and hydrogenolysis of coal to hydrocarbon fuels.

By supercritical fluid we mean a dense fluid that is maintained above its critical points (31° C. and 72.8 atm for $CO_2$). Such fluids are less viscous and diffuse more readily than liquids, and are thus more efficient than other solvents in liquid chromatography.

EXAMPLE 1

Hydrogenation of iso-alpha-acids to tetrahydroiso-alpha-acids (α-hydrohop)

Figure 1:
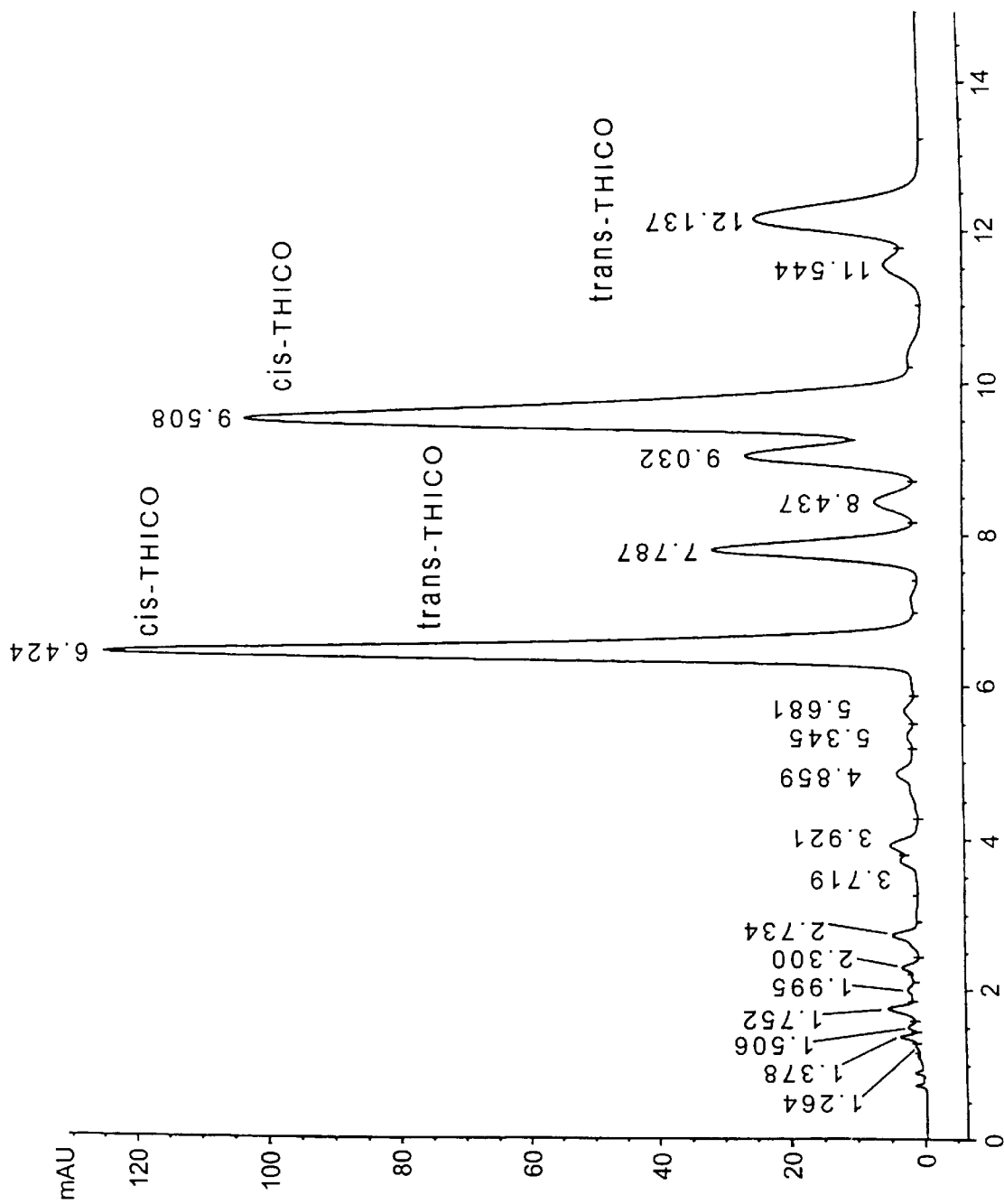
FIG. 1 is a high performance liquid chromatography (HPLC) plot of the hydrogenation of iso-alpha-acids using liquid $CO_2$ as a solvent.

Tetrahydroiso-alpha-acids were prepared by hydrogenation of the pre-isomerized alpha-acids, i.e. iso-alpha-acids. Due to equipment constraints on a laboratory scale, dry ice was used as the source for liquid $CO_2$ and hydrogen was pressurized in the reactor. As the reactor warmed up to room temperature (25–27° C.), dry ice was liquefied and the inner pressure rose to 800–950 psig. The iso-alpha-acids were dissolved in liquid $CO_2$ to allow hydrogenation to take place. Surprisingly, the reduction occurred although an incomplete product was formed in the first trial. After modification, the hydrogenation of iso-alpha-acids reaction was a success. It resulted in a product of tetrahydroiso-alpha-acids similar to that obtained using ethanol as a solvent as confirmed by HPLC (FIG. 1).

0.8 g of Degussa E-105x/w hydrogenation catalyst (5% Pd/C; 10% loading) and approximately 250–300 g of dry ice were added to 5.5 g of pilot plant Iso extract (containing 74.5% or 4.1 g of iso-alpha-acids) in an one-liter reactor. The reactor was equipped with an agitator, a cooling coil, a hydrogen delivery tube and a thermometer. The reactor was then charged with 90 psig of hydrogen and heated to room temperature. The hydrogenation reaction was maintained at 25° C. for 1.5 hours as the pressure rose from 100 to 900 psig. $CO_2$ was then vented and 5 g of a residue was obtained. The product or residue contained about 60% of tetrahydroiso-alpha-acids by HPLC. The yield was calculated to be 80%.

EXAMPLE 2

Hydrogenation of Beta-acids

Tetrahydroiso-alpha-acids were prepared from beta-acids involving three steps: hydrogenolysis/hydrogenation, oxidation, and isomerization. Pure colupulone was used as the feed material for this study. The hydrogenation/hydrogenolysis reaction conditions were as described below. As a result, the hydrogenation reaction was favored and produced hexahydrocolupulone with less than 10% hydrogenolysis product (tetrahydrodesoxycohumulone) formed.

The reactor was charged with 5 g of colupulone (96% pure) and 1 g of 5% Pd/C. 250–300 g of dry ice were added to the reactor and then the reactor was charged with 90 psig of hydrogen. Upon heating to 27° C., the pressure rose to 950 psig. After two hours, the reaction was worked up similar to the procedure as in Example 1 above to yield 4.8 g of oil. HPLC analysis indicated that the oil consisted of 10% tetrahydrodesoxycohumulone (11% yield) with the balance being hexahydrocolupulone (87%).

EXAMPLE 3

Hydrogenolysis/Hydrogenation of Beta-acids with Modifier (β-hydrohop)

Figure 2:
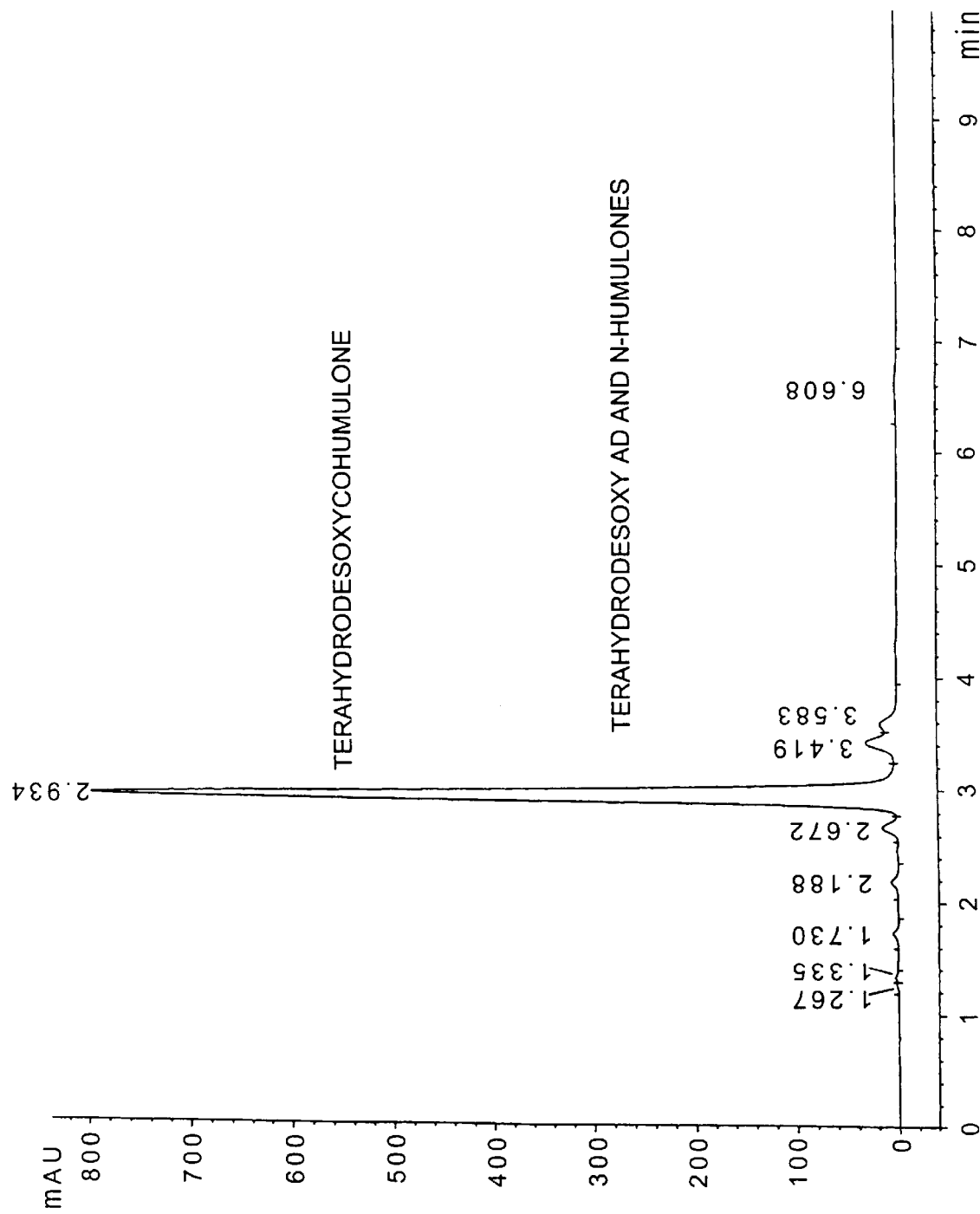
FIG. 2 is an HPLC plot of the hydrogenation of colupulone using liquid $CO_2$ as a solvent.

In order to facilitate the hydrogenolysis reaction, a small amount of acidic water was blended with liquid $CO_2$. A greater conversion of colupulone to its corresponding desoxy compound was achieved. When a blend of acidic ethanol and liquid $CO_2$ were used as the solvent, a balanced hydrogenation/hydrogenolysis reaction resulted. A 70% yield of the tetrahydrodesoxycohumulone was confirmed by HPLC (FIG. 2). Those skilled in the art will appreciate that other lower alkyl alcohols (methanol, isopropanol, etc.) can be used as a modifier to achieve the same effect. By lower alkyl we mean a saturated linear, branched, or cyclic hydrocarbon having 1–6 carbons. A small amount of this modifier improves the solubility of inorganic acid and the fluidity of the reaction mixture, and facilitates the transferability of the finished product to filtration and/or evaporation equipment.

The desoxy compounds so produced can be converted into the desired tetrahydroisocohumulone by subsequent oxidation/isomerization following the procedure in J. Cowles, et al., U.S. Pat. No. 4,644,084.

The reaction was carried out in a manner similar to that in Example 2 above, except a modifier containing 10 ml of 95% ethanol and 0.5 ml of sulfuric acid were added. As a result, the yield of tetrahydrodesoxycohumulone as confirmed by HPLC was 70%.

EXAMPLE 4

Hydrogenation of Alpha-acids (alternative α-hydrohop)

Figure 3:
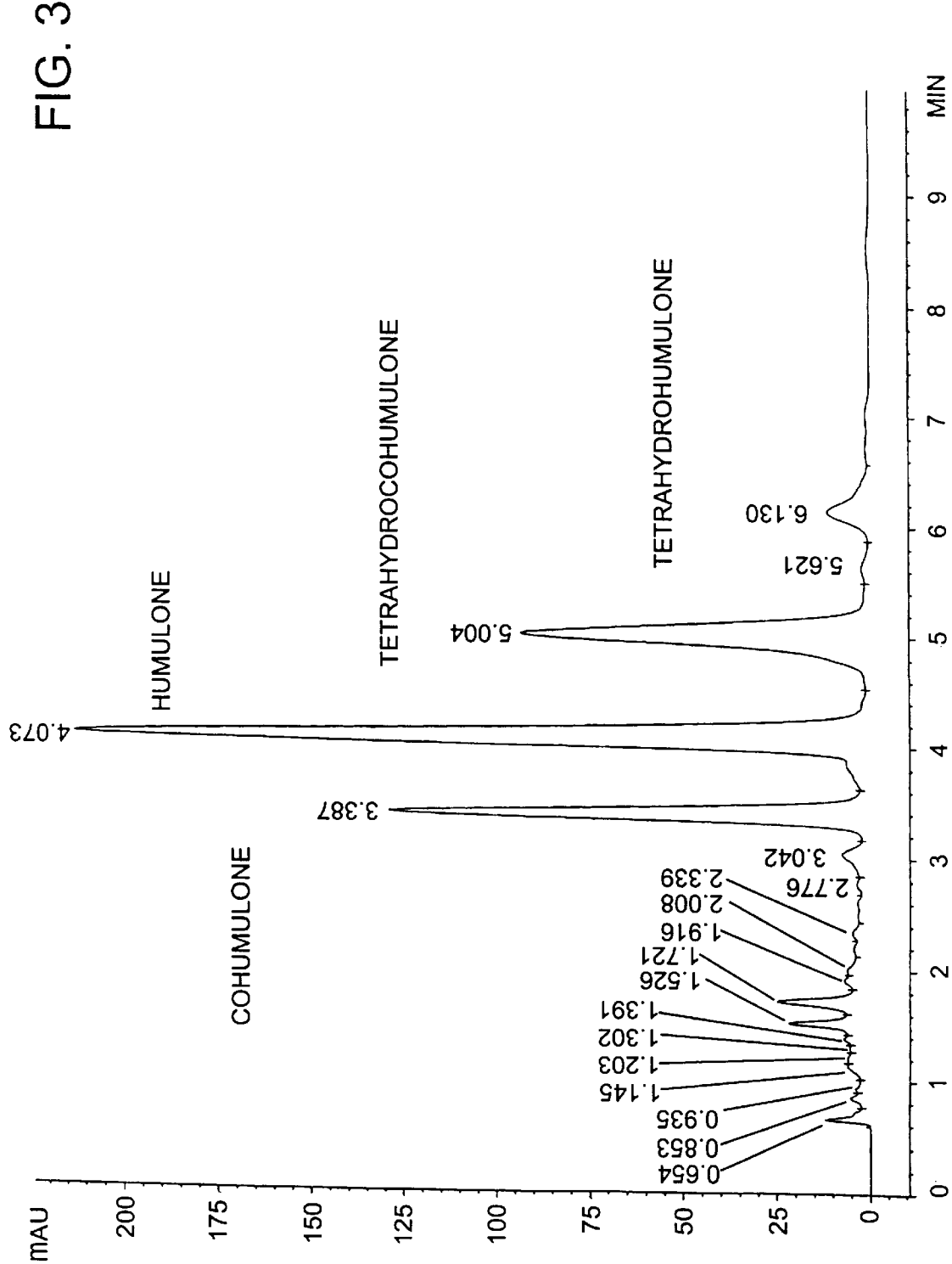
FIG. 3 is an HPLC plot of the partial hydrogenation of alpha-acids using liquid $CO_2$ as a solvent.

The tetrahydroiso-alpha-acids can also be prepared by direct hydrogenation of alpha-acids and subsequent isomerization. However, hydrogenation of alpha-acids does not prevent side-reactions (e.g. hydrogenolysis) which produces an alpha-acid type hydroquinone along with tetrahydro alpha-acids using a palladium/carbon catalyst (M. Anteunis, et al., "On the Hydrogenation of Humulone", *Bull. Soc. Chim. Belg.* 68:476–583 (1959); P. Todd, U.S. Pat. No. 5,296,637. Using a pilot plant alpha-acid extract (containing 82.8% alpha-acids) as feed material and liquid $CO_2$ as the solvent, hydrogenation was carried out with a catalyst of palladium on carbon. Unexpectedly, the reaction produced a product containing 25% tetrahydro-alpha-acids and 51% of starting alpha-acids mixture (see FIG. 3). Although hydrogenation was incomplete, side reaction products were either absent or present in only trace amounts. This incomplete hydrogenation unexpectedly provides a unique method for the preparation of a mixture of iso-alpha-acids and tetrahydroiso-alpha-acids by isomerizing the hydrogenated mixture.

One g of Degussa E-105x/w catalyst and 250 g of dry ice were mixed with 5 g of a pilot plant alpha-acid extract (82.8% alpha-acids) in the reactor. The reactor was pressurized with 90 psig of hydrogen, heated and agitated. When the reactor temperature reached room temperature (25–27° C.), the inner pressure rose to 800–950 psig. After 1.5 hours, the reaction was stopped by venting out the gas. After final work up, the yield was about 4.75 g of oil. Using HPLC analysis the oil material was found to contain 25% tetrahydro-alpha-acids (28.3% yield) with 51.6% of starting alpha-acids.

Figure 4:
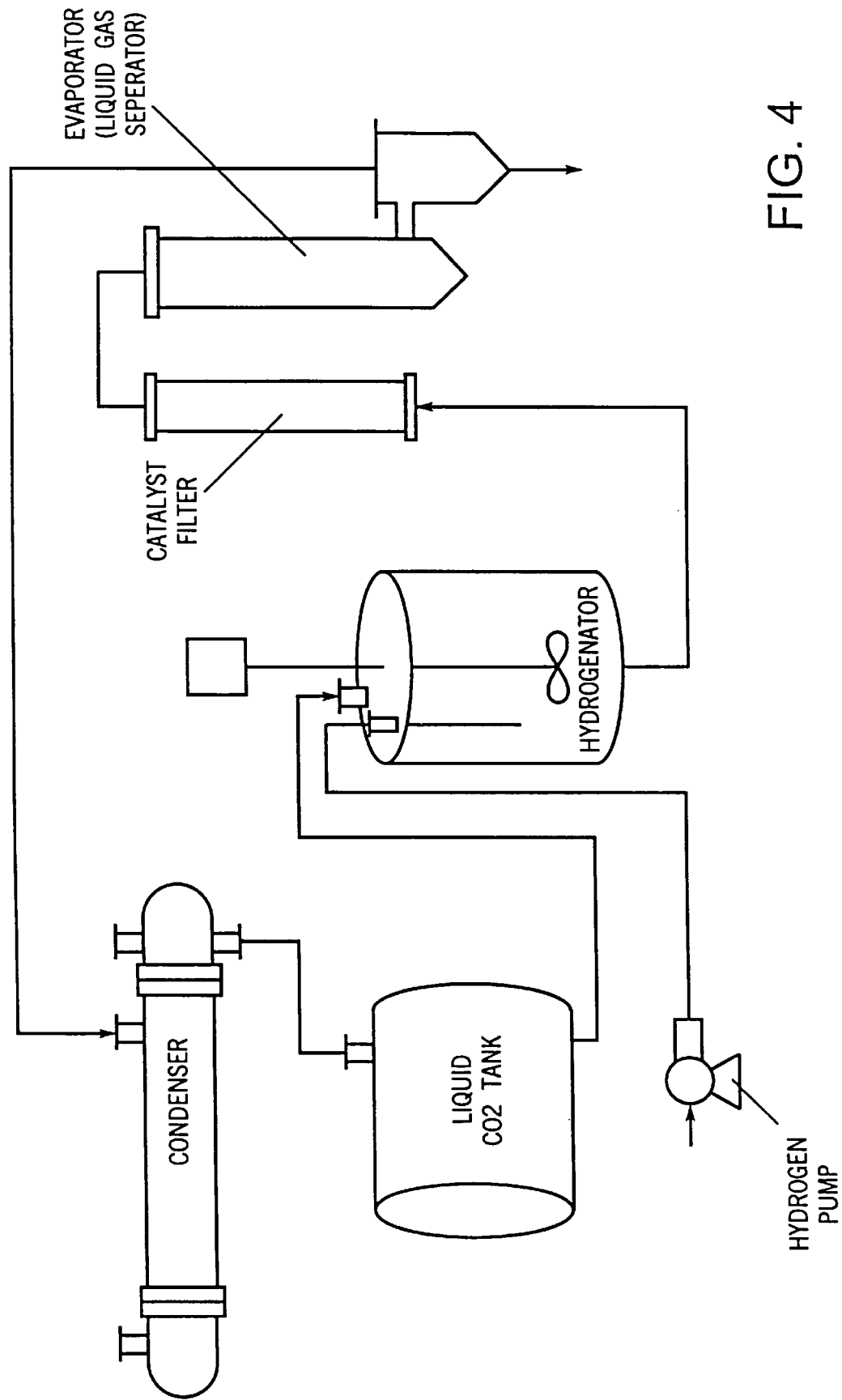
FIG. 4 is a schematic of one version of an equipment layout that can be used to practice the present invention.

An illustration of a proposed equipment design is depicted in the accompanying FIG. 4. The equipment includes a liquid $CO_2$ tank, a hydrogenation reactor, a hydrogen supply pump, a catalyst filter (able to operate under very high pressure), an evaporator to separate hop compounds and $CO_2$, and a condenser to recycle gaseous $CO_2$.

EXAMPLE 5

Hydrogenation of Iso-alpha-acids to Tetrahydroiso-alpha-acids

The hydrogenation of Example 1 was repeated but the reaction was maintained for 3 hours to test for over-reduction. A near quantitation (about 100% yield at 80% purity) of tetrahydroiso-alpha-acids was obtained. This example shows that by using the $CO_2$ solvent system, the iso-alpha-acids are less susceptible to be over-reduced to the inactive side-products.

EXAMPLE 6

Hydrogenation of Alpha-acids

The hydrogenation of Example 4 was repeated except that a 5 hour reaction time was maintained. The conversion of alpha-acids to tetrahydroalpha-acids was improved over Example 5, but the reaction was not complete. A mixture containing 41.3% tetrahydro-alpha-acids and 30.6% alpha-acids was obtained, meaning that there was a 53% yield of tetrahydroalpha-acids with 40% alpha-acids remaining.

EXAMPLE 7

Hydrogenation/Hydrogenolysis of Hop Soft Resins using Supercritical $CO_2$ as a Solvent If appropriate high pressure equipment is available, the hydrogenation could be performed similar to the above methods of using liquid $CO_2$ (200–950 psig from 0°–30° C.). For example, iso-alpha-acids (or alpha-acids, beta-acids, etc.) and a Pd/C catalyst are charged with supercritical $CO_2$ to a high pressure reactor equipped with an agitator and a heating system. The $CO_2$ supplied from a regular liquid $CO_2$ cylinder is pressurized by a compressor to a range of 1000 psig–4000 psig and the reactor is heated to a range of 30°–65° C. A high pressure metering pump is used to deliver hydrogen into the reactor. After completion of the reaction, the mixture is filtered through a filter and left the catalyst behind. The end product is obtained by evaporation of $CO_2$ solvent from a liquid/gas separator and the $CO_2$ is recovered.

We found that the optimum solubility conditions for tetrahydroiso-alpha-acids (the end product of the hydrogenation of iso-alpha-acids) in supercritical $CO_2$ was 1400–1700 psig at 40° C. These conditions would then be suitable for the hydrogenation reaction in supercritical $CO_2$.

In the similar manner, hydrogenolysis and hydrogenation of beta-acids to tetrahydrodesoxy-alpha-acids can be performed in the presence of an acidified alcohol (see Example 3) and a Pd/C catalyst under the above supercritical $CO_2$ conditions.

Alternatively, using dry ice as the $CO_2$ source and high pressure laboratory equipment, a one liter autoclave is charged with dry ice and heated to above 30° C. to reach the supercritical conditions (preferably 1400–1700 psig and 40° C.).

CONCLUSIONS

The use of liquid or supercritical $CO_2$ as the solvent for hydrogenation is a viable and unique process. Liquid $CO_2$ is more economical than ethanol ($0.28/gallon vs. $30/gallon) and it is not flammable. $CO_2$ is particularly safe and suitable for food and beverage preparation.

The use of liquid $CO_2$ as the solvent for the hydrogenation of iso-alpha-acids to tetrahydroiso-alpha-acids for light stable bittering agent preparation has proven to be surprisingly successful. Hydrogenation/hydrogenolysis of beta-acids with no modifier was shown to be an inefficient way to prepare tetrahydrodesoxy-alpha-acids, but a good organic solvent free method to prepare hexahydro-beta-acids. The hexahydro-beta-acids have been found to be a potent agent for inhibiting Listeria growth (P. Todd, U.S. Pat. Nos. 5,166,449 and 5,082,975; M. Barney, et al., U.S. Pat. No. 5,455,038.)

Using a modifier, such as acidic ethanol, enhanced the hydrogenolysis reactions of beta-acids to a complete reaction and resulted in the production of desired desoxy compounds (precursors of tetrahydro-alpha-acids). Subsequent oxidation/isomerization as taught in the J. Cowles patent, supra, produced tetrahydroiso-alpha-acids.

At present, the hydrogenation of alpha-acids using liquid $CO_2$ and a palladium/carbon catalyst resulted in an incomplete reaction which led to a mixture of tetrahydro-alpha-acids and the starting alpha-acids. However, the incomplete reaction product can be isomerized to a mixture of tetrahydroiso-alpha-acids and iso-alpha-acids. This product can be used as both bittering and foam enhancing agents for non-light stable products. This method leads to a simpler one-step reaction to produce two different types of hop bittering compounds compared to the method disclosed in U.S. Pat. No. 5,200,227 (where two types of iso-alpha-acids prepared from two methods are blended together).

Although the present invention has been described with reference to certain preferred embodiments, other variants are possible. For instance, although Examples 1–6 show preferred pressures and temperatures using liquid $CO_2$ as a reaction solvent, a pressure of 200–950 psig and 0°–30° C. is also acceptable. Those skilled in the art will also appreciate that other organic compounds can be hydrogenated using the carbon dioxide reaction solvent of the present invention. For example, using the carbon dioxide reaction solvent of the present invention, aromatics can be converted to cycloparaffins and unsaturated vegetable oils can be converted to solid fats by addition of hydrogen to the double bonds. Other examples will be apparent to those skilled in the art. Therefore, the scope of the claims is not limited to the specific examples of the preferred versions herein. Rather, the claims should be looked to in order to judge the full scope of the invention.

We claim:

1. A method of hydrogenating at least one compound selected from the group consisting of alpha-acids, iso-alpha-acids, and beta-acids, comprising:
    combining the compound, hydrogen, and a hydrogenation catalyst on carbon with a carbon dioxide reaction medium to form a mixture; and
    reacting the mixture under suitable conditions to thereby hydrogenate the compound.

2. The method of claim 1, wherein the carbon dioxide is liquid.

3. The method of claim 1, wherein the carbon dioxide is supercritical.

4. The method of claim 1, wherein the mixture is reacted at a temperature of about 0° to 65° C. and a pressure of about 200 to 4000 psig.

5. A method of making tetrahydroiso-alpha-acids comprising:
    combining iso-alpha-acids, hydrogen, and a hydrogenation catalyst on carbon with a carbon dioxide reaction medium to form a mixture;
    reacting the mixture under suitable conditions to thereby hydrogenate the iso-alpha-acids to tetrahydroiso-alpha-acids; and
    recovering the tetrahydroiso-alpha-acids from the reaction mixture.

6. The method of claim 5, wherein the carbon dioxide is liquid.

7. The method of claim 5, wherein the carbon dioxide is supercritical.

8. The method of claim 5, wherein the mixture is reacted at a temperature of about 0° to 65° C. and a pressure of about 200 to 4000 psig.

9. The method of claim 1, further comprising the steps of separating the catalyst from the reaction mixture and recycling the catalyst.

10. The method of claim 1, further comprising the step of recycling the carbon dioxide.

11. The method of claim 5, further comprising the steps of separating the catalyst from the reaction mixture and recycling the catalyst.

12. The method of claim 5, further comprising the step of recycling the carbon dioxide.

* * * * *